Nov. 11, 1969 C. E. FRIESNER 3,478,138
METHOD OF MAKING THERMOPLASTIC ARTICLES HAVING NON-PLANAR SURFACE CONTOURS
Filed Dec. 1, 1966
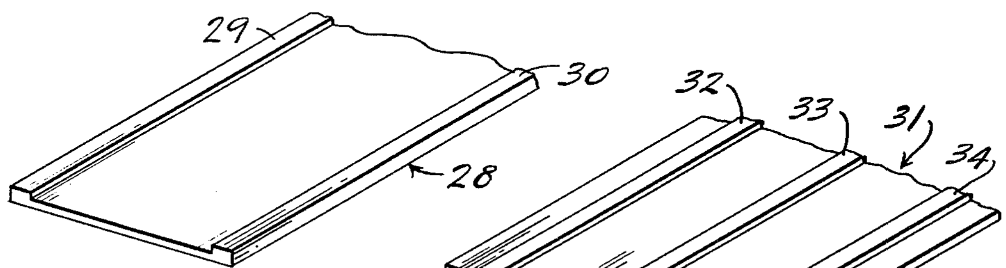
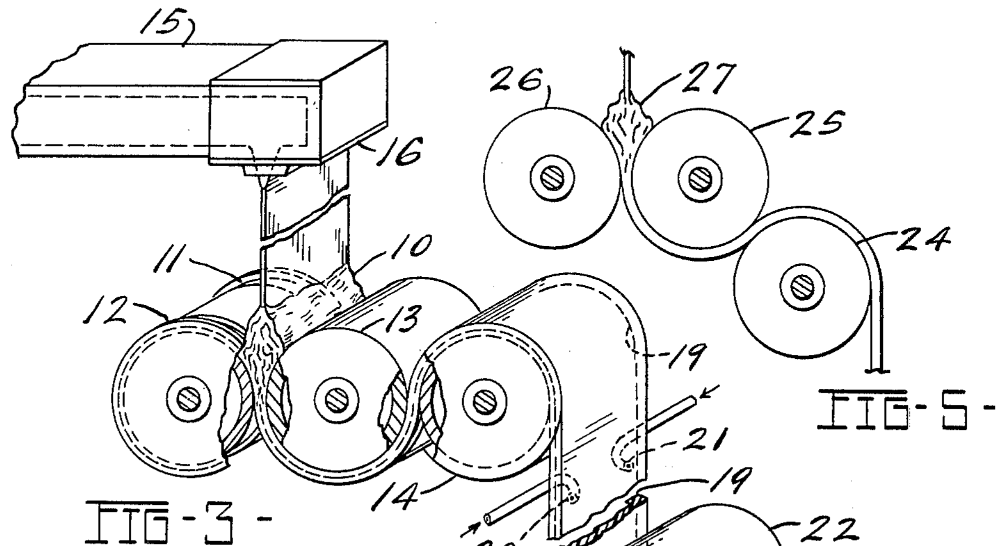
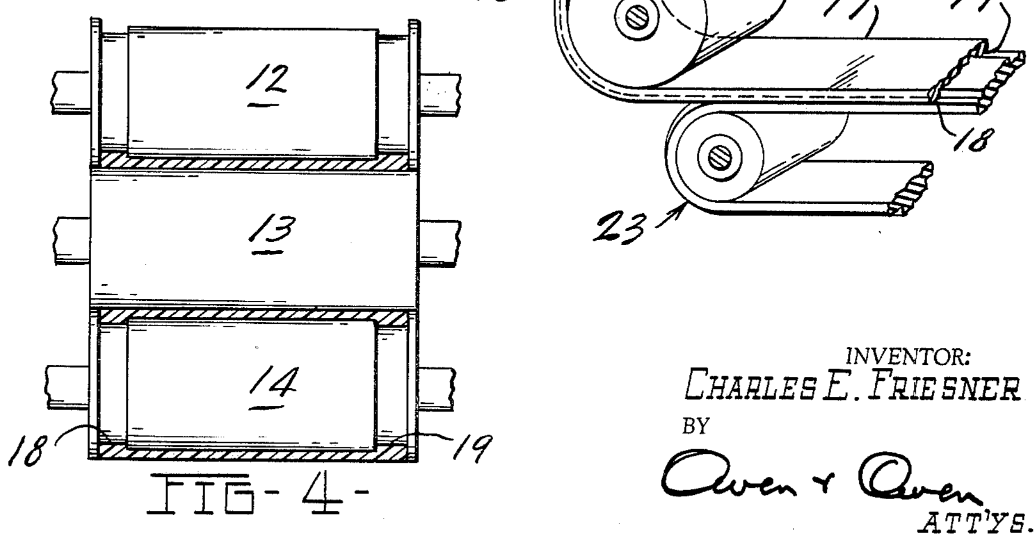
INVENTOR:
CHARLES E. FRIESNER
BY
Owen & Owen
ATT'YS.

United States Patent Office 3,478,138
Patented Nov. 11, 1969

3,478,138
METHOD OF MAKING THERMOPLASTIC ARTICLES HAVING NON-PLANAR SURFACE CONTOURS

Charles E. Friesner, 6535 Kemner Road, R.F.D. 1, Pemberville, Ohio 43450

Filed Dec. 1, 1966, Ser. No. 598,476
Int. Cl. B29d 7/14
U.S. Cl. 264—145 12 Claims

ABSTRACT OF THE DISCLOSURE

A method of manufacturing thermoplastic articles having at least one non-planar surface contour which involves the steps of extruding or otherwise depositing a mass of workable thermoplastic material into the nip between two driven counter rotating rolls, one of which has a contour which is the complementarily shaped negative of the desired end product contour, and pulling said material through the nip to form a continuous strip of material having the desired surface contour. Preferably the strip thus formed is pulled through the nip between one of the first two and a third roll to set the contour. While the material is being pulled through the series of rolls, it is simultaneously allowed to cool from a temperature above its temperature of total fusion* to one below its glass transition temperature*. Thereafter individual articles are cut to the desired length from the continuous strip thus formed.

The prior art

In recent years the number and variety of purposes for which plastic materials have been used has increased significantly. Plastics are now used in many areas in place of steel or wood, particularly where weight saving is an important consideration. Thus, for example, plastics are used as room dividers and as shelving in cabinets which are installed in mobile homes. The room dividers and shelves have a generally planar configuration; however, intricate surface designs are desirable on the room dividers, and, because of the stress placed on the shelves when they are loaded, it has been found desirable to reinforce them with supporting ribs on the back side. These ribs are generally narrow and run longitudinally the length of the shelves. In the past the shelves have been manufactured by individually molding each shelf to the desired configuration. Extruding the shelves in continuous strips and then cutting individual shelves from the strip would be a more economical operation. Conventional dies for extrusion apparatus are, however, expensive and the design of a proper die for the extrusion of a generally planar shelf having spaced apart, relatively narrow ribs is difficult, due to the tendency of the material to deform after leaving the bushing. The problem becomes particularly acute as the width of the shelf or the like increases, e.g., to 12 inches or more.

Objects

It is an object of this invention to provide a method of forming continuous strips of thermoplastic material having at least one contoured, non-planar major surface.

It is a further object of the invention to provide a method of forming continuous strips of thermoplastic material having two contoured, non-planar major surfaces.

It is another object of the invention to provide a method of forming continuous strips of thermoplastic material having two contoured, and different, non-planar major surfaces.

*Subsequently defined herein.

It is a still further object of this invention to provide a method of forming continuous strips of thermoplastic material having reinforcing ribs projecting from at least one surface thereof.

It is still another object of this invention to provide a method of manufacturing shelves having reinforcing ribs projecting from the surface thereof.

The invention

A new method has been discovered for making shelves having reinforcing ribs projecting from at least one major surface thereof, as well as other thermoplastic articles having non-uniform surface contours, in continuous strips, from which the individual shelves or articles can be cut.

The method comprises the steps of depositing a quantity of thermoplastic material at a temperature above its temperature of total fusion [1] into the nip between two counterdriven rolls, controlling the quantity of material deposited relative to the rate at which said rolls are driven so that the quantity of said material is sufficient to produce a section of said material of the desired width and thickness and having the desired surface contour. One of the rolls has a configuration which is the reverse of, or complementary to, the desired final product configuration. The material is forced through the nip between said rolls to form a strip of the desired cross section. Thereafter, the strip preferably is drawn partially around one of the rolls and through the nip between that roll and a third roll having a configuration which is the reverse of, or complementary to, the desired final product configuration. While said material is passing through the two or three unit series of rolls, the rate at which said rolls are driven relative to the rate at which heat is removed from said material is controlled so that the material cools from a temperature above its temperature of total fusion to one below its glass transition temperature.[2] Thus it has assumed a permanent configuration by the time it leaves the calender rolls.

This invention will be more fully understood from the description to follow, and from the drawings in which:

FIG. 1 is a perspective view of the under surface of a shelf having a pair of supporting ribs located at the edges thereof;

FIG. 2 is a perspective view of the under surface of a shelf showing supporting ribs located at intermediate positions thereon;

FIG. 3 is a schematic view in perspective, showing apparatus which is used in carrying out the method of the invention;

[1] As used above and elsewhere herein the term "temperature of total fusion" refers to that temperature at which a synthetic thermoplastic resin melts or becomes "plastic." In the case of a plastisol composition comprising a synthetic thermoplastic resin dispersed in a plasticizer, it refers to that temperature at which the resin totally absorbs the plasticizer. In the case of two or more resin materials differing in molecular weight only but containing no plasticizers it may be described as the temperature at which there is a complete intimate intermingling of the two or more materials in question. The temperature of total fusion or flux temperature as it is sometimes called can be determined by a number of different means. A convenient method is by using a Braybender Plastigraph. This machine measures the amount of torque required by rotating devices to convert a resin powder to the liquid state and correlates it with the temperature. As the resin is converted from a powder to a liquid, the torque increases and the temperature rises, however, at the moment the temperature of total fusion is reached, the torque requirements drop suddenly. The temperature of the resin at the point of maximum torque requirement is considered the temperature of total fusion.

[2] The term "glass transition temperature," as used herein and in the appended claims, refers to the maximum temperature at which there is significant inter-molecular attraction within the material in question. Such temperature can be determined by measuring viscosity as a function of temperature as the material is cooled from its temperature of total fusion; the glass transition temperature is the temperature at which there is an abrupt and disproportionate increase in viscosity.

FIG. 4 is a partial cross-sectional view of the apparatus shown in FIG. 3 showing the surface contour of the individual calender rolls; and FIG. 5 is a schematic view of another arrangement of the apparatus used in carrying out the method of the invention.

Referring to FIGS. 3 and 4, in carrying out the method of this invention, a quantity of thermoplastic material 10 is deposited in the V-shaped region 11 above the nip between the first two rolls 12 and 13 of a three unit series of cooperating rolls 12, 13 and 14. The rate the material 10 is deposited relative to the rate the rolls 12 and 13 are driven must be controlled so that the quantity deposited will produce a continuous strip of said material of the desired thickness and contour when it is drawn through the nip of rolls 12 and 13. Thus, the faster the rolls 12 and 13 are operated, the greater is the quantity of material which must be deposited. The material 10 may be deposited in any desirable manner from any source. It is preferably deposited, however, in a continuous manner from an extruder 15. The extruder 15 can have a die 16 so that the material is extruded in a sheet-like form, but this is not necessary, and the extruder 15 can be of any suitable screw or ram type.

In the preferred embodiment shown, the first roll 12 of the three unit series of cooperating rolls 12, 13 and 14 has a surface contour which is the reverse or negative of the desired end product surface contour. The second or middle roll 13 is cyilndrical in shape and forms the back surface of the desired end product to a flat configuration. The third roll 14 is identical to the first roll 12. When the thermoplastic material 10 is led through the nip between the two rolls 12 and 13, a continuous strip 17 is formed, one side (the side in contact with the roll 13) being essentially flat and the other (the side in contact with the roll 12) having the desired surface contour. Thus the formed strip as seen in FIG. 3, has a pair of spaced apart reinforcing ribs 18 and 19 formed by the portions of smaller diameter on the rolls 12 and 14. The ribs 18 and 19 are merely thickened areas of thermoplastic material and have a configuration which is first imparted by roll 12. The rolls 12, 13 and 14 are preferably chrome plated or otherwise coated so that the thermoplastic material will not stick thereto.

As shown in FIG. 3, the apparatus includes nozzles 20 and 21 through which compressed air from a suitable source (not illustrated) can be directed aaginst the sheet material to accelerate cooling. The nozzles discharge compressed air principally in the vicinity of the juncture between the ribs 18 and 19 and the adjacent web. It has been found that, when the strip 17 is made from polyethylene as subsequently described in an example, forced rapid cooling in this vicinity, for example by compressed air discharged from the nozzles 20 and 21, is important because, if such cooling is not used, the junctures between the ribs 18 and 19 and the adjacent web material become regions of weakness: a sharp blow will actually cause rupture. When, however, compressed air is discharged, as described, the strip 17 is structurally sound, and without discoverable regions of weakness. The reason for this phenomenon is not fully understood. It is hypothecated that, when forced cooling is not used, the ribs 18 and 19 constitute heat sumps from which heat is transferred to the regions of the connecting web immediately adjacent the ribs, and that this, in some way, causes a thermal stress, the final result of which is a region of weakness. In any event, the localized forced cooling avoids this problem.

It is preferred that the strip 17 leave the roll 14 at a comparatively high temperature below the glass transition temperature. As shown in FIG. 3, after leaving the roll 14, the strip 17 passes partially around and under a roll 22, which can be driven by any suitable means (not illustrated), and at a rate which is controlled to maintain constant a given width dimension, for example the internal distance between the ribs 18 and 19. After passing under the roll 22 the continuous strip 17 can be directed, on a continuous conveyor belt 23, to a suitable cutting machine (not illustrated).

If desired, the center roll 13 can be contoured to impart a non-planar configuration to the continuous strip, while the two outside rolls 12 and 14 have a cylindrical surface. It is preferred to use the outside rolls for contouring purposes, however, and so to use the roll 13 only when both major surfaces are to have a non-planar configuration. The rolls 12, 13 and 14 may be driven by appropriate gearing or endless belts, by a prime mover or electric motor, as would be apparent to those skilled in the art.

Generally the three rolls 12, 13 and 14 are of the same width and diameter, although they do not have to be. Thus, for example, roll 12 could have an eight inch diameter and rolls 13 and 14 could have 12 inch diameters. All that is required is that they be of sufficient diameter so that cuts can be made in them to impart the desired contour to the thermoplastic material.

It is not essential either that all of the rolls be horizontally situated on the same plane. Thus, as shown in FIG. 5, for example, a roll 24 could be located below a roll 25, but it must be so situated that the nip between rolls 24 and 25 is substantially the same size as the nip between the roll 25 and a roll 26. Thermoplastic material 27 is deposited in the region above the nip between the rolls 25 and 26, as in the apparatus of FIG. 3. It is also possible to mount the three rolls vertically one over another, and to extrude the thermoplastic material horizontally into the nip between two of the cooperating rolls.

Although all three rolls can be operated at the same speed with satisfactory results, it is preferable, particularly when the thermoplastic material is capable of strength increase as a consequence of molecular orientation as, for example, is polyethylene, that the second roll (13 in the apparatus of FIGS. 3 and 4) be operated at a faster peripheral speed than the other two. This causes a pulling of the material in contact with the faster roll 13 through the nip between the rolls 12 and 13; the result is molecular orientation of the thermoplastic material. A product with improved tear strength and tensile strength is achieved thereby when the thermoplastic material is, for example, polyethylene. Thus, regardless of the relative diameters of the rolls 12, 13 and 14, their surface speeds may be regulated through appropriate gearing to achieve the optimum combination for producing the most uniform product at high production rates.

When the thermoplastic material 10 is deposited at the nip between rolls 12 and 13, it must be at a temperature above its temperature of total fusion in order that it can be easily formed to the desired surface contour. In order to retain the shape imparted by the nip between the rolls 12 and 13, the temperature of the thermoplastic material must be reduced to below its glass transition temperature. This can be done simply by allowing the heat to dissipate therefrom as it passes over the rolls 12, 13 and 14, or it can also be done by cooling the rolls. The temperature of the continuous strip 17 with its contoured surface, after it leaves the roll 14, must be below its glass transition temperature.

The thermoplastic material can be of any desired type. Polyethylene, polystyrene, polyvinylchloride, vinylchloride vinyl acetate copolymers, polytetrafluoroethylene, nylon and polymethyl methacrylate are all suitable materials. The particular type of material to be used depends on the end product desired. When it is desired to make reinforced shelves, polyethylene may be used advantageously, but this invention is not limited to a method of making such polyethyelne strips.

It is to be understood that while thermoplastic synthetic resins are the esssential constituents of the thermoplastic material, other ingredients may be added. Additives such as plasticizers, lubricants, fillers, dyes, pigments, stabilizers, etc. are conventionally used in producing previously known thermoplastic products and are understood to be encompassed by the recitation thermoplastic material. The additives have perhaps the greatest influence on the properties exhibited by the final products. These additives have the general effect on the synthetic resin of affecting the degree of hardness, the ease of material processability, resistance to abrasion and chemicals, and the final finish of the material.

The method of this invention will be more clearly understood from the following example of a preferred embodiment which is presented only to illustrate and disclose, and is not to be construed as limiting the invention.

EXAMPLE

Polyethylene [3] at a temperature of 420° F. was extruded at a rate of approximately 350 lbs. per hour from a breaker plate of an extruder, using no die, and deposited in the nip between the first two of a three unit series of cooperating chrome plated rolls. The first or outer roll had the surface contour of the roll 12, which was the negative or the reverse of the contour desired for one major surface of the product. The second roll was cylindrical in shape (the roll 13), and the third roll was identical to the first (the roll 14). The diameter of all three rolls at their largest diameter was 12 inches. The rolls were 48 inches wide. The first two cooperating rolls were spaced ¼ inch apart at their closest point, and the third roll was spaced from the second roll by the same distance.

The deposited material was pulled continuously through the nip between the first and second cooperating rolls at the rate of approximately 350 lbs. per hour, and through the nip between the second and third in a reverse direction. The rolls were driven so that the peripheral speed of the first was about 34 inches per minute, the peripheral speed of the second was about 38 inches per minute, and the peripheral speed of the third was about 36 inches per minute. The first two rolls were maintained at about 250° F., and the third was maintained at 200° F. by circulation therethrough of a heated or cooled heat transfer fluid, as required.

After the formed strip had passed over the third roll the temperature of the strip was about 220° F. Thereafter the strip was led through a trimmer where excess material was cut from the sides, and then individual shelves 28 (FIG. 1) were cut to appropriate lengths from the continuous strip. The shelves 28 had ribs 29 and 30 corresponding to the ribs 18 and 19 on the strip 17.

A similar method can be used to produce a shelf 31 (FIG. 2) having ribs 32, 33 and 34 projecting from intermediate points on one surface, or to produce other shapes of constant cross section or of varying cross section in a pattern which repeats each circumference of the contouring roll. One or both of the major surfaces can be non-planar.

What I claim is:

1. A method of producing a continuous strip of thermoplastic material having at least one non-planar surface comprising the steps of introducing a quantity of a thermoplastic material at a temperature above its temperature of total fusion into the nip between first and second driven cooperating rolls, one of said first and second rolls having a contour which is the reverse of a desired non-planar contour for a first major surface of the finished product, and the other of said first and second rolls having a contour which is the reverse of a desired contour for a second major surface of the finished product, controlling the rate at which said material is introduced relative to the rate at which said rolls are driven so that the quantity of said material introduced is sufficient to produce a continuous strip of said material having the contour of the nip between said first and second rolls, drawing said material through the nip between said first and second rolls and partially around said second roll, and controlling the relative rates at which said rolls are driven, and at which heat is removed from the material, so that the strip of thermoplastic material leaving said second roll is at a temperature below its glass transition temperature, and force cooling said strip primarily at the junctures of the planar and non-planar portions of said first major surface.

2. A method of producing a continuous strip of thermoplastic material having at least one non-planar surface comprising the steps of introducing a quantity of a thermoplastic material at a temperature above its temperature of total fusion into the nip between first and second rolls of a three unit series of driven cooperating rolls, one of said first and second rolls having a contour which is the reverse of a desired non-planar contour for a first major surface of the finished product, the other of said first and second rolls having a contour which is the reverse of a desired contour for a second major surface of the finished product, and the third roll of said three unit series having a surface contour which is substantially identical with that of said first roll, controlling the rate at which said material is introduced relative to the rate at which said rolls are driven so that the quantity of said material introduced is sufficient to produce a continuous strip of said material having the contour of the nip between said first and second rolls, drawing said material through the nip between said first and second rolls, partially around said second roll, through the nip between said second and third rolls, and partially around said third roll, and controlling the relative rates at which said rolls are driven and at which heat is removed from the material, so that the strip of thermoplastic material leaving said third roll is at a temperature below its glass transition temperature, and force cooling said strip primarily at the junctures of the planar and non-planar portions of said first major surface.

3. A method of producing a continuous strip of thermoplastic material having at least one irregularly contoured surface comprising the steps of introducing a quantity of a thermoplastic material at a temperature above its temperature of total fusion into the nip between first and second driven cooperating rolls, one of said first and second rolls having a contour which is the reverse of a desired irregular contour for a first major surface of the finished product, and the other of said first and second rolls being of cylindrical contour, controlling the rate at which said material is introduced relative to the rate at which said rolls are driven so that the quantity of said material introduced is sufficient to produce a continuous strip of said material having the contour of the nip between said first and second rolls, drawing said material through the nip between said first and second rolls and partially around said second roll, and controlling the relative rates at which said rolls are driven, and at which heat is removed from the material, so that the strip of thermoplastic material leaving said second roll is at a temperature below its glass transition temperature, and force cooling said strip primarily at the juncture of the planar and non-planar portions of said first major surface.

4. A method of producing shelves composed of a thermoplastic material comprising the steps of continuously extruding in a continuous sheet a quantity of a thermoplastic material at a temperature above its temperature of total fusion into the area above the nip of the first and second driven cooperating rolls, said first roll having a contour which is the reverse of a desired non-planar contour for a major surface of the finished product, and said second roll having a cylindrical contour, controlling the rate at which said material is extruded relative to the rate at which said rolls are driven so that the quantity of said material extruded is sufficient to produce a continuous strip of said material having the contour of the nip between said first and second rolls, drawing said

[3] The material used had a density of 0.94 gram per ml., a temperature of total fusion of 380–400° F., and a glass transition temperature of about 305° F.

material through the nip between said first and second rolls and partially around said second roll, and controlling the relative rates at which said rolls are driven, and at which heat is removed from the material, so that the strip of thermoplastic material leaving said second roll is at a temperature below its glass transition temperature, force cooling said strip with compressed gas primarily at the junctures of the planar and non-planar portions of said major surface, and thereafter cutting individual articles of the desired size from said continuous strip.

5. A method of producing shelves having reinforcing ribs from a thermoplastic material comprising the steps of introducing a quantity of a thermoplastic material at a temperature above its temperature of total fusion into the nip between first and second driven cooperating counter-rotating rolls, said first roll having a contour which is the reverse of a desired non-planar contour for a major surface of the finished product, and said second roll having a substantially cylindrical contour, controlling the rate at which said material is introduced relative to the rate at which said rolls are driven so that the quantity of said material introduced is sufficient produce a continuous strip of said material having the contour of the nip between said first and second rolls, drawing said material through the nip between said first and second rolls and partially around said second roll, and controlling the relative rates at which said rolls are driven, and at which heat is removed from the material, so that the strip of thermoplastic material leaving said second roll is at a temperature below its glass transition temperature, force cooling said strip with compressed gas primarily at the junctures of the planar and non-planar portions of said major surface, trimming excess material from said strip, and thereafter cutting off individual articles of desired length from said continuous strip.

6. A method of producing polyethylene articles comprising the steps of extruding in a continuous sheet a quantity of polyethylene at a temperature of at least 380° F. into the area above the nip of first and second driven cooperating rolls horizontally situated, said first roll having a contour which is the reverse of a desired non-planar contour for a major surface of the finished product, and the second roll having a cylindrical contour, controlling the rate at which said polyethylene is extruded relative to the rate at which said rolls are driven so that the quantity of said polyethylene extruded is sufficient to produce a continuous strip of said polyethylene having the contour of the nip between said first and second rolls, drawing said polyethylene through the nip between said first and second rolls and partially around said second roll, and controlling the relative rates at which said rolls are driven, and at which heat is removed from the material, so that the strip of polyethylene leaving said second roll is at a temperature below about 305° F., force cooling said strip with compressed gas primarily at the junctures of the planar and non-planar portions of said major surface, trimming excess material from said strip, thus formed, and thereafter cutting individual articles of the desired size from said strip.

7. A method of producing a continuous strip of thermoplastic material having at least one non-planar surface comprising the steps of introducing a quantity of a thermoplastic material at a temperature above its temperature of total fusion into the nip between first and second rolls of a three unit series of driven cooperating rolls, one of said first and second rolls having a contour which is the reverse of a desired non-planar contour for a major surface of the finished product, the other of said first and second rolls having a cylindrical contour, and the third roll of said three unit series having a surface contour which is substantially identical with that of said first roll, controlling the rate at which said material is introduced relative to the rate at which said rolls are driven so that the quantity of said material introduced is sufficient to produce a continuous strip of said material having the contour of the nip between said first and second rolls, drawing said material through the nip between said first and second rolls, partially around said second roll, through the nip between said second and third rolls, and partially around said third roll, and controlling the relative rates at which said rolls are driven and at which heat is removed from the material, so that the strip of thermoplastic material leaving said third roll is at a temperature below its glass transition temperature, and force cooling said strip with compressed gas primarily at the junctures of the planar and non-planar portions of said major surface.

8. A method of producing shelves and room dividers composed of thermoplastic material comprising the steps of continuously extruding a quantity of a thermoplastic material at a temperature above its temperature of total fusion into the area above the nip between first and second rolls of a three unit series of driven cooperating rolls, said first roll having a contour which is the reverse of a desired non-planar contour for a major surface of the finished product, said second roll having a cylindrical contour, and the third roll of said three unit series having a surface contour which is substantially identical with that of said first roll, controlling the rate at which said material is extruded relative to the rate at which said rolls are driven so that the quantity of said material extruded is sufficient to produce a continuous strip of said material having the contour of the nip between said first and second rolls, drawing said material through the nip between said first and second rolls, partially around said second roll, through the nip between said second and third rolls, and partially around said third roll, and controlling the relative rates at which said rolls are driven and at which heat is removed from the material, so that the strip of thermoplastic material leaving said third roll is at a temperature below its glass transition temperature, force cooling said strip with compressed gas primarily at the junctures of the planar and non-planar portions of said major surface, and thereafter cutting individual articles of the desired size from said continuous strip.

9. A method of producing shelves having reinforcing ribs from a thermoplastic material comprising the steps of extruding a quantity of a thermoplastic material at a temperature above its temperature of total fusion into the nip between first and second rolls of a three unit series of driven cooperating rolls, said first roll having a contour which is the reverse of a desired non-planar contour for a major surface of the finished product, said second roll having a cylindrical contour, and the third roll of said three unit series having a surface contour which is substantially identical with that of said first roll, controlling the rate at which said material is extruded relative to the rate at which said rolls are driven so that the quantity of said material extruded is sufficient to produce a continuous strip of said material having the contour of the nip between said first and second rolls, drawing said material through the nip between said first and second rolls, partially around said second roll, through the nip between said second and third rolls, and partially around said third roll, and controlling the relative rates at which said rolls are driven and at which heat is removed from the material, so that the strip of thermoplastic material leaving said third roll is at a temperature below its glass transition temperature, force cooling said strip with compressed gas primarily at the junctures of the planar and non-planar portions of said major surface, trimming excess material from said strip, and thereafter cutting off individual articles of desired length from said continuous strip.

10. A method of producing polyethylene articles comprising the steps of introducing a quantity of polyethylene at a temperature above about 380° F. into the nip between first and second rolls of a three unit series of driven cooperating rolls, said first roll having a contour which is the reverse of a desired non-planar contour for a major surface of the finished product, said second roll having a cylindrical contour, and the third roll of said three unit series having a surface contour which is substantially identical with that of said first roll, controlling the rate at which said polyethylene is introduced relative to the rate at which said rolls are driven so that the quantity of said polyethylene introduced is sufficient to produce a continuous strip of said polyethylene having the contour of the nip between said first and second rolls, drawing said polyethylene through the nip between said first and second rolls, partially around said second roll, through the nip between said second and third rolls, and partially around said third roll, and controlling the relative rates at which said rolls are driven and at which heat is removed from said polyethylene, so that the strip of polyethylene leaving said third rol is at a temperature below about 305° F., force cooling said strip with compressed gas primarily at the junctures of the planar and non-planar portions of said major surface, trimming excess material from said strip, thus formed, and thereafter cutting individual articles of the deired size from said strip.

11. A method of producing a continuous strip of polyethylene having at least one substantially planar surface with non-planar projections thereon comprising the steps of introducing a quantity of polyethylene at a temperature above its temperature of total fusion into the nip between first and second rolls of a three unit series of driven cooperating rolls, one of said first and second rolls having a contour which is the reverse of a desired contour for a first major surface of the finished product, said surface being substantially planar with non-planar projections thereon, the other of said first and second rolls having a contour which is the reverse of a desired contour for a second major surface of the finished product, and the third roll of said three unit series having a surface contour which is substantially identical with that of said first roll, controlling the rate at which said polyethylene is introduced relative to the rate at which said rolls are driven so that the quantity of said polyethylene introduced is sufficient to produce a continuous strip of said polyethylene having the contour of the nip between said first and second rolls, drawing said polyethylene through the nip between said first and second rolls, partially around said second roll, through the nip between said second and third rolls, and partially around said third roll, controlling the relative rates at which said rolls are driven and at which heat is removed from the polyethylene, so that the strip of polyethylene leaving said third roll is at a temperature below its glass transition temperature, and force cooling said strip with compressed gas primarily at the juncture of said planar and non-planar portions of said first major surface.

12. A method of producing a continuous strip of thermoplastic material having at least one non-planar surface comprising the steps of introducing a quantity of a thermoplastic material at a temperautre above its temperature of total fusion into the nip between first and second rolls of a three unit series of driven cooperating rolls, the second of said rolls being operated at a faster peripheral speed than the first and third rolls, the first of said rolls having a contour which is the reverse of the desired non-planar contour for a first major surface of the finished product, and the second of said rolls having a cylindrical contour, the third of said three unit series having a surface contour which is substantially identical with that of the first roll, controlling the rate at which said material is introduced relative to the rate at which said rolls are driven so that the quantity of said material introduced is sufficient to produce a continuous strip of said material having the contour of the nip between said first and second rolls, drawing said material into the nip between said first and second rolls, partially around said second roll, through the nip between said second and third rolls, and partialy around said third roll, and controlling the relative rates of which said rolls are driven and the rate at which heat is removed from the material, so that the strip of thermoplastic material leaving said third roll is at a temperature below its glass transition temperature, and force cooling said strip with compressed gas primarily at the junctures of the planar and non-planar portions of said major surface.

References Cited

UNITED STATES PATENTS

| | | | |
|---|---|---|---|
| 2,736,066 | 2/1956 | Chren et al. | 264—216 |
| 2,928,133 | 3/1960 | Schairer | 264—146 |
| 2,988,774 | 6/1961 | Hely | 264—151 |
| 3,085,292 | 4/1963 | Kindseth | 264—175 |
| 3,256,376 | 6/1966 | Leedy et al. | 264—151 |
| 3,328,503 | 6/1967 | Ancker | 264—175 |

ROBERT F. WHITE, Primary Examiner

J. R. THURLOW, Assistant Examiner

U.S. Cl. X.R.

18—2; 264—151, 175, 237, 284